US012617933B2

(12) United States Patent
Nakamura et al.

(10) Patent No.: US 12,617,933 B2
(45) Date of Patent: May 5, 2026

(54) GLASS FILLER POWDER

(71) Applicant: NIPPON ELECTRIC GLASS CO., LTD., Otsu (JP)

(72) Inventors: Masashi Nakamura, Otsu (JP); Jun Kinoshita, Otsu (JP); Shigeyuki Fukusaka, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 523 days.

(21) Appl. No.: 18/022,182

(22) PCT Filed: Sep. 17, 2021

(86) PCT No.: PCT/JP2021/034215
§ 371 (c)(1),
(2) Date: Feb. 20, 2023

(87) PCT Pub. No.: WO2022/070971
PCT Pub. Date: Apr. 7, 2022

(65) Prior Publication Data
US 2023/0323091 A1     Oct. 12, 2023

(30) Foreign Application Priority Data
Oct. 2, 2020     (JP) ................................. 2020-167514

(51) Int. Cl.
$C08K\ 7/28$ (2006.01)
$C03C\ 3/093$ (2006.01)
$C03C\ 11/00$ (2006.01)

(52) U.S. Cl.
CPC ............... $C08K\ 7/28$ (2013.01); $C03C\ 3/093$ (2013.01); $C03C\ 11/002$ (2013.01); $C08K\ 2201/005$ (2013.01); $C08K\ 2201/006$ (2013.01)

(58) Field of Classification Search
CPC ...... C08K 7/28; C08K 7/20; C08K 2201/005; C08K 2201/006; C03C 3/093; C03C 11/002; C03C 3/097; C03C 12/00; C03B 19/104; C03B 19/108
USPC ...................................................... 523/219
See application file for complete search history.

(56) References Cited

U.S. PATENT DOCUMENTS

| | | | | |
|---|---|---|---|---|
| 6,184,621 B1 * | 2/2001 | Horiuchi | ................. | H01J 11/12 |
| | | | | 313/586 |
| 2003/0143486 A1 * | 7/2003 | Kubota | ................. | G03F 7/0047 |
| | | | | 430/311 |

| | | | | |
|---|---|---|---|---|
| 2005/0079450 A1 * | 4/2005 | Yoshida | ............... | H05K 3/1258 |
| | | | | 430/320 |
| 2005/0082691 A1 * | 4/2005 | Ito | ........................... | C08K 3/36 |
| | | | | 257/788 |
| 2013/0102453 A1 | 4/2013 | Enomoto | | |

FOREIGN PATENT DOCUMENTS

| | | |
|---|---|---|
| JP | 2009-051879 A | 3/2009 |
| JP | 2011-213570 A | 10/2011 |
| JP | 2011-225402 A | 11/2011 |
| JP | 2015-183192 A | 10/2015 |
| JP | 2016-138180 A | 8/2016 |
| JP | 2019-112283 A | 7/2019 |

OTHER PUBLICATIONS

JP-Information offer issued on Nov. 14, 2024 in Application No. 2020-167514.
Malvern Panalytical Ltd. website, "Particle Size, Analysis of Particle Size Distribution from Sub-Nanometer to Millimeter," [Searched on Nov. 14, 2024], Internet <https://www.malvernpanalytical.com/jp/products/measurement-type/particle-size>, with partial English-language translation.
Japanese Office Action issued Nov. 27, 2024 in Application No. 2020-167514.
Japanese Office Action issued Oct. 2, 2024 in Application No. 2020-167514.
Japanese Office Action issued Oct. 23, 2024 in Application No. 2020-167514.
International Search Report mailed Nov. 9, 2021 for PCT/JP2021/034215.
Written Opinion of the International Searching Authority mailed Nov. 9, 2021 for PCT/JP2021/034215.
Extended European Search Report issued on Dec. 18, 2024 in the corresponding European Patent Application No. 21875273.1.
Third Party Observation issued on Apr. 17, 2025 in the corresponding Eurpoean patent application No. 21875273.1.
Japanese Office Action issued Apr. 16, 2025 in Application No. 2020-167514.
First Chinese Office Action issued Mar. 19, 2025 in Application No. 202180066967.8.
Second Chinese Office Action issued Sep. 23, 2025, in Application No. 202180066967.8.
Chinese Office Action issued Jan. 30, 2026 in Application No. 202180066967.8.

* cited by examiner

*Primary Examiner* — Hannah J Pak
(74) *Attorney, Agent, or Firm* — Faegre Drinker Biddle & Reath LLP

(57)     ABSTRACT

A glass filler powder includes a bubble therein, a volume fraction of the bubble being from 0.2% to 2%.

11 Claims, No Drawings

GLASS FILLER POWDER

TECHNICAL FIELD

The present invention relates to a glass filler powder used for improving the mechanical strength of a resin.

BACKGROUND ART

The addition of a filler powder to a resin material has been studied for the purpose of improving the mechanical strength of a formed object including a resin material such as a photocurable resin. An application that is under study is using such a formed object in denture. In order to give an artificial denture a similar appearance to a human tooth (aesthetic appearance), the filler powder must have suitable optical properties. As such, the use of a glass filler powder having excellent light-transmission properties as the filler powder is being studied (see, for example, Patent Document 1).

CITATION LIST

Patent Literature

Patent Document 1: JP 2016-138180 A

SUMMARY OF INVENTION

Technical Problem

Known glass filler powders have an excessively high light transmittance. As such, when a known glass filler powder is blended with a resin to prepare a resin composition, a formed object including the resulting resin composition also tends to have a high light transmittance. Accordingly, when the resulting resin composition is used to produce a denture, the denture also has an excessively high light transmittance. Such a denture deviates from the appearance of a human tooth and is less appealing aesthetically. Note that, although it is conceivable to reduce the light transmittance of the formed object by reducing the amount of the glass filler powder blended, this will make it difficult to ensure the mechanical strength necessary for a denture.

In view of the above, an object of the present invention is to provide a glass filler powder capable of, when mixed with a resin, imparting suitable light-transmission properties and making a formed object more appealing aesthetically.

Solution to Problem

As a result of intensive studies by the present inventors, it was discovered that the above problems can be solved by a glass filler powder containing a predetermined amount of bubbles therein.

That is, a glass filler powder according to an embodiment of the present invention includes a bubble therein, a volume fraction of the bubble being from 0.2% to 2%. In this way, the inclusion of a minute amount of bubbles inside the glass filler powder allows for suitable adjustment of the light-transmission properties of a formed object including a resin composition using the glass filler powder, making the formed object more appealing aesthetically and suitable for denture application.

The glass filler powder according to an embodiment of the present invention is preferably substantially spherical. In this way, the contact interface with resin is reduced; as such, excessive light scattering in a formed object including a resin composition using the glass filler powder can be suppressed, and suitable light-transmission properties can be imparted to the formed object. In addition, an undesirable increase in the viscosity of the resin composition can be suppressed, and formability can be improved.

The glass filler powder according to an embodiment of the present invention preferably has a specific surface area of 2 $m^2/g$ or less. In this way, the contact interface with resin is reduced; as such, excessive light scattering in a formed object including a resin composition using the glass filler powder can be suppressed, and suitable light-transmission properties can be imparted to the formed object. In addition, an undesirable increase in the viscosity of the resin composition can be suppressed, and formability can be improved.

The glass filler powder according to an embodiment of the present invention preferably has an average particle size of 8 μm or less. In this way, dispersibility in resin can be increased.

The glass filler powder according to an embodiment of the present invention preferably has a refractive index nd from 1.48 to 1.62. In this way, the refractive index of the glass filler powder according to an embodiment of the present invention easily matches with the refractive index of the resin, and suitable light-transmission properties can be imparted to a formed object including a resin composition using the glass filler powder.

The glass filler powder according to an embodiment of the present invention preferably contains from 40 to 80 mass % of $SiO_2$, from 0 to 30 mass % of $Al_2O_3$, from 2 to 20 mass % of $B_2O_3$, from 0 to 25 mass % of CaO, from 0 to 10 mass % of ZnO, from 0 to 10 mass % of $Li_2O$, from 0 to 30 mass % of $Na_2O$, from 0 to 30 mass % of $K_2O$, from 0 to 20 mass % of $Nb_2O_5$, from 0 to 20 mass % of $WO_3$, from 0.1 to 30 mass % of $Nb_2O_5+WO_3$, from 0.1 to 15 mass % of $TiO_2$, and from 0 to 10 mass % of F.

The glass filler powder according to an embodiment of the present invention is preferably blended with a resin for use.

A resin composition according to an embodiment of the present invention contains the glass filler powder described above and a resin.

A formed object according to an embodiment of the present invention includes the resin composition described above.

The formed object according to an embodiment of the present invention preferably has a thickness of 0.5 mm and a light transmittance at a wavelength of 600 nm from 60% to 89%. In this way, the desired aesthetics of the formed object can be easily achieved, making the formed object suitable for denture application.

A method for manufacturing a filler powder according to an embodiment of the present invention is a method for manufacturing any of the glass filler powders described above and includes grinding and classifying a glass raw material to yield a glass powder and heating and melting the glass powder to spheroidize the glass powder.

In the method for manufacturing a filler powder according to an embodiment of the present invention, the glass raw material is preferably ground by a ball mill.

Advantageous Effects of Invention

According to an embodiment of the present invention, it is possible to provide a glass filler powder capable of, when mixed with a resin, imparting suitable light-transmission properties and making a formed object including a resin composition more appealing aesthetically.

DESCRIPTION OF EMBODIMENTS

Preferred embodiments of a glass filler powder of the present invention and other components will be described below.

Glass Filler Powder

The glass filler powder according to an embodiment of the present invention includes a bubble therein. A volume fraction of the bubble in the glass filler powder is preferably from 0.2% to 2%, more preferably from 0.5% to 1.5%, and particularly preferably from 0.6% to 1.2%. When the volume fraction of the bubble is too small, the light transmittance of the glass filler powder is too high, and the light transmittance of a formed object including a resin composition using the glass filler powder also increases, resulting in the tendency of less appealing aesthetics. Meanwhile, when the volume fraction of the bubble is too large, the light transmittance of the glass filler powder is too low, and the light transmittance of a formed object including a resin composition using the glass filler powder also decreases, also resulting in the tendency of less appealing aesthetics. Note that, as described below, the volume fraction of the bubble in the glass filler powder can be adjusted as appropriate by a manufacturing step of the glass filler powder (in particular, a grinding step of a glass raw material).

Although not limited, the glass filler powder according to an embodiment of the present invention is preferably substantially spherical (particularly preferably spherical). This makes it possible to achieve a smaller specific surface area and a smaller contact interface with resin.

As a result, excessive light scattering in a formed object including a resin composition using the glass filler powder can be suppressed, and suitable light-transmission properties can be imparted to the formed object. In addition, an undesirable increase in the viscosity of the resin composition can be suppressed, and formability can be improved.

The degree of sphericity can be expressed by roundness. A roundness of the glass filler powder according to an embodiment of the present invention is preferably 2 $\mu$m or less, more preferably 1.5 $\mu$m or less, and particularly preferably 1 $\mu$m or less. The roundness is determined by the following equation using the maximum particle size $D_{max}$ and the minimum particle size $D_{min}$ of particles.

$$\text{Roundness } (\mu m) = (D_{max} - D_{min})/2$$

A specific surface area of the glass filler powder according to an embodiment of the present invention is preferably 2 $m^2/g$ or less, more preferably 1.6 $m^2/g$ or less, even more preferably 1.4 $m^2/g$ or less, and particularly preferably 1.2 $m^2/g$ or less. When the specific surface area is too large, the contact interface with resin increases, and light scattering tends to occur inside a formed object including a resin composition using the glass filler powder. As a result, the light-transmission properties of the formed object tend to degrade excessively. In addition, the viscosity of the resin composition tends to increase undesirably, and formability tends to deteriorate. The lower limit of the specific surface area is not limited, but is practically 0.1 $m^2/g$ or greater.

An average particle size ($D_{50}$) of the glass filler powder according to an embodiment of the present invention is preferably 8 $\mu$m or less, and particularly preferably 7 $\mu$m or less. When the average particle size is too large, the dispersibility of the glass filler powder in a resin tends to be inferior. The lower limit of the average particle size is not limited, but when the average particle size is too small, the specific surface area increases, and light scattering tends to occur inside a formed object including a resin composition using the glass filler powder. As such, the average particle size of the glass filler powder is preferably 1 $\mu$m or greater, more preferably 3 $\mu$m or greater, and particularly preferably 5 $\mu$m or greater.

Note that, in the present invention, an average particle size ($D_{50}$) means a value measured by the laser diffraction method.

A refractive index nd of the glass filler powder according to an embodiment of the present invention is preferably from 1.48 to 1.62. In this way, the refractive index of the glass filler powder according to an embodiment of the present invention easily matches with the refractive index of the resin, and suitable light-transmission properties can be imparted to a formed object including a resin composition using the glass filler powder.

The glass filler powder according to an embodiment of the present invention preferably contains from 40 to 80 mass % of $SiO_2$, from 0 to 30 mass % of $Al_2O_3$, from 2 to 20 mass % of $B_2O_3$, from 0 to 25 mass % of $CaO$, from 0 to 10 mass % of $ZnO$, from 0 to 10 mass % of $Li_2O$, from 0 to 30 mass % of $Na_2O$, from 0 to 30 mass % of $K_2O$, from 0 to 20 mass % of $Nb_2O_5$, from 0 to 20 mass % of $WO_3$, from 0.1 to 30 mass % of $Nb_2O_5+WO_3$, from 0.1 to 15 mass % of $TiO_2$, and from 0 to 10 mass % of F. The reason for limiting the glass composition in this manner will be described below. Note that, in the description regarding the content of each component below, "%" means "mass %" unless otherwise indicated.

$SiO_2$ is a component that forms a glass network. $SiO_2$ is also a component that improves chemical durability and devitrification resistance. A content of $SiO_2$ is preferably from 40% to 80%, more preferably from 50% to 80%, even more preferably from 50% to 75%, and particularly preferably from 50% to 65%. When the content of $SiO_2$ is too small, chemical durability tends to deteriorate; moreover, the glass tends to devitrify, which may make the manufacture difficult. Meanwhile, when the content of $SiO_2$ is too large, meltability tends to deteriorate. An excess amount of $SiO_2$ may also make softening difficult during forming, which in turn may make the manufacture difficult.

$Al_2O_3$ is a vitrification stabilizing component. $Al_2O_3$ is also a component that improves chemical durability and devitrification resistance. A content of $Al_2O_3$ is preferably from 0% to 30%, more preferably from 2.5% to 25%, and particularly preferably from 5% to 20%. When the content of $Al_2O_3$ is too large, meltability tends to deteriorate. An excess amount of $Al_2O_3$ may also make softening difficult during forming, which in turn may make the manufacture difficult.

$B_2O_3$ is a component that forms a glass network. $B_2O_3$ is also a component that improves chemical durability and devitrification resistance. A content of $B_2O_3$ is preferably from 2% to 20%, more preferably from 3% to 19%, and particularly preferably from 5% to 17%. When the content of $B_2O_3$ is too small, chemical durability tends to deteriorate. Moreover, the glass tends to devitrify, which may make the manufacture difficult. Meanwhile, when the content of $B_2O_3$ is too large, meltability tends to deteriorate. An excess amount of $B_2O_3$ may also make softening difficult during forming, which in turn may make the manufacture difficult.

$CaO$ is an alkaline earth material and is a component that stabilizes vitrification as an intermediate. A content of $CaO$ is preferably from 0% to 25%, more preferably from 0.5% to 20%, and particularly preferably from 1% to 15%. When the content of CaO is too large, chemical durability tends to deteriorate; moreover, the glass tends to devitrify, which may make the manufacture difficult.

ZnO is a component that reduces the viscosity of glass and suppresses devitrification. A content of ZnO is preferably from 0% to 10%, more preferably from 0.1% to 9%, even more preferably from 0.4% to 7%, and particularly preferably from 0.6% to 5%. When the content of ZnO is too large, chemical durability tends to deteriorate; moreover, the glass tends to devitrify, which may make the manufacture difficult.

$Li_2O$ is a component that reduces the viscosity of glass and suppresses devitrification. A content of $Li_2O$ is preferably from 0% to 10%, more preferably from 0% to 9%, even more preferably from 0% to 7%, and particularly preferably from 0% to 5%. When the content of $Li_2O$ is too large, chemical durability tends to deteriorate; moreover, the glass tends to devitrify, which may make the manufacture difficult.

$Na_2O$ is a component that reduces the viscosity of glass and suppresses devitrification. A content of $Na_2O$ is preferably from 0% to 30%, more preferably from 0% to 25%, even more preferably from 0% to 20%, and particularly preferably from 0% to 15%. When the content of $Na_2O$ is too large, chemical durability tends to deteriorate; moreover, the glass tends to devitrify, which may make the manufacture difficult.

$K_2O$ is a component that reduces the viscosity of glass and suppresses devitrification. A content of $K_2O$ is preferably from 0% to 30%, more preferably from 0.1% to 25%, even more preferably from 0.5% to 20%, and particularly preferably from 1% to 15%. When the content of $K_2O$ is too large, chemical durability tends to deteriorate; moreover, the glass tends to devitrify, which may make the manufacture difficult.

$Nb_2O_5$ is a component capable of adjusting the refractive index and the Abbe number. A content of $Nb_2O_5$ is preferably from 0% to 20%, more preferably from 0.1% to 15%, even more preferably from 0.5% to 10%, and particularly preferably from 1% to 5%. When the content of $Nb_2O_5$ is too large, the glass tends to devitrify.

$WO_3$ is a component capable of adjusting the refractive index and the Abbe number, and is a component that reduces the viscosity of the glass. A content of $WO_3$ is preferably from 0% to 20%, more preferably from 0.1% to 15%, even more preferably from 0.5% to 10%, and particularly preferably from 1% to 5%. When the content of $WO_3$ is too large, the glass tends to devitrify.

Note that a total amount of $Nb_2O_5$ and $WO_3$ is preferably from 0.1% to 30%, more preferably from 0.1% to 25%, even more preferably from 1 to 20%, and particularly preferably from 2 to 10%. When these components are within the range described above, the refractive index and the Abbe number are easily adjusted, and coloring is less likely to occur. Moreover, devitrification of glass is easily suppressed. Furthermore, a glass with high chemical durability is easily obtained.

$TiO_2$ is a component capable of adjusting the refractive index and the Abbe number, and is a component that reduces the viscosity of the glass. A content of $TiO_2$ is preferably from 0.1% to 15%, more preferably from 0.1% to 12%, even more preferably from 0.5% to 10%, and particularly preferably from 1% to 5%. When the content of $TiO_2$ is too small, the desired optical properties are difficult to achieve, and chemical durability tends to deteriorate as well. Meanwhile, when the content of $TiO_2$ is too large, the desired optical properties are also difficult to achieve. In addition, the glass tends to be colored, and the light transmittance tends to deteriorate.

Note that a total amount of $Nb_2O_5$, $WO_3$, and $TiO_2$ is preferably from 0.1% to 30%, more preferably from 0.1% to 25%, even more preferably from 1% to 20%, and particularly preferably from 3% to 15%. When these components are within the respective range described above, the refractive index and the Abbe number are easily adjusted, and devitrification of glass is easily suppressed. Furthermore, a glass with high chemical durability is easily obtained.

F is a component that forms a glass network. Also, F is a component capable of increasing the transmittance, particularly the transmittance in the ultraviolet region. A content of F is preferably from 0% to 10%, more preferably from 0% to 7.5%, even more preferably from 0% to 5%, and particularly preferably from 0% to 3%. When the content of F is too large, chemical durability tends to deteriorate. Furthermore, F is highly volatile, and the component sublimated during a manufacturing step (especially the spheroidizing step) may adhere to the glass surface and deteriorate the surface properties.

Note that the glass filler powder according to an embodiment of the present invention may contain a component described below in addition to the components described above. MgO, SrO, BaO, and ZnO are components that, similar to CaO, stabilize vitrification as intermediates. A total content of these components is preferably from 0% to 50%, more preferably from 0.1% to 50%, even more preferably from 0.5% to 40%, and particularly preferably from 1% to 30%. When the content of these components is too large, chemical durability tends to deteriorate; moreover, the glass tends to devitrify, which may make the manufacture difficult.

Method for Manufacturing Glass Filler Powder

The glass filler powder according to an embodiment of the present invention can be produced by a method including grinding and classifying a glass raw material to yield a glass powder and heating and melting the glass powder to spheroidize the glass powder. Each step will be described in detail below.

First, a raw material batch prepared by mixing raw material powders in a predetermined ratio is melted at 1400 to 1700° C., resulting in a molten glass. Next, the molten glass is formed into a predetermined shape (e.g., the shape of a film), resulting in a glass raw material.

Next, the resulting glass raw material is ground and classified, yielding in a glass powder. A ball mill is preferably used for grinding. As presented in the examples described below, by changing the grinding time using the ball mill, the volume fraction of the bubble in the yielded glass filler powder can be adjusted. This is because the glass powder tends to agglomerate during the grinding of the glass raw material using a ball mill, and the agglomeration in turn tends to cause generation of the bubble. Specifically, when the grinding time in the ball mill is short, agglomeration of the glass powder is less likely to occur during the grinding by the ball mill, and the bubble resulting from the agglomeration are less likely to be generated. Meanwhile, when the grinding time in the ball mill is long, the glass powder tends to agglomerate, and the agglomeration tends to cause generation of the bubble. From this viewpoint, the grinding time in the ball mill is preferably from 1 to 30 hours, more preferably from 3 to 20 hours, and particularly preferably from 5 to 10 hours. In addition, an additional grinding step using a grinding device other than a ball mill (for example, a jet mill) may be implemented depending on the target particle size.

The classification can be carried out by a known method, such as air classification, elutriation classification, or sieving. The classification is performed mainly for the purpose of removing fine powder. When fine powder is contained in the glass powder, agglomerates tend to form in the subsequent spheroidizing step. In this case, the gaps between the fine powder particles may remain inside the glass filler powder as a bubble. Note that, the glass raw material may be ground and classified at the same time by using a grinder with a built-in classifier (such as a jet mill). This makes it possible to simplify the manufacturing steps.

Subsequently, the resulting glass powder is spheroidized by heat treatment, resulting in the glass filler powder. Examples of a method of heating and melting include a method of supplying a glass powder into a furnace by a table feeder or the like, heating at 1400 to 2000° C. using an air burner or the like to soften and fluidize the glass powder, during which the glass powder is spheroidized due to surface tension, and cooling and collecting the resulting product.

The spheroidized glass filler powder may be further classified to achieve a desired particle size distribution. Further, when necessary, a post-processing step such as cleaning or surface treatment may be added. Examples of the surface treatment include a treatment using a silane coupling agent. Treatment with a silane coupling agent can increase the bonding strength between the glass filler powder and a resin, making it possible to yield a formed object having a higher mechanical strength. Furthermore, the affinity between the glass filler powder and a resin can be improved, bubbles and gaps at the interface can be reduced, and excessive light scattering can be suppressed. Preferred examples of the silane coupling agent include an aminosilane, an epoxysilane, and an acrylsilane. Note that the silane coupling agent may be selected as appropriate depending on the resin to be used.

Resin

A resin used in a resin composition according to an embodiment of the present invention will be described.

Examples of the resin include curable resins such as photocurable resins and thermosetting resins; the resin can be selected as appropriate depending on the forming method to be employed. For example, when stereolithography is employed, a liquid photocurable resin may be selected, and when a powder sintering method is employed, a powdered thermosetting resin may be selected.

Examples of the photocurable resin include a polyamide-based resin, a polyamide-imide-based resin, a polyacetal-based resin, a (meth)acrylic-based resin, a melamine resin, a (meth)acrylic-styrene copolymer, a polycarbonate-based resin, a styrene-based resin, a polyvinyl chloride-based resin, benzoguanamine-melamine formaldehyde, a silicone-based resin, a fluorine-based resin, a polyester-based resin, a cross-linked (meth)acrylic-based resin, a cross-linked polystyrene-based resin, a cross-linked polyurethane-based resin, and an epoxy-based resin.

Examples of the thermosetting resin include an epoxy-based resin, a thermosetting modified polyphenylene ether-based resin, a thermosetting polyimide-based resin, a urea-based resin, an allyl resin, a silicon resin, a benzoxazine-based resin, a phenol-based resin, an unsaturated polyester-based resin, a bismaleimide-triazine resin, an alkyd-based resin, a furan-based resin, a melamine-based resin, a polyurethane-based resin, and an aniline-based resin.

Resin Composition

The resin composition may be produced by mixing the glass filler powder with the resin in a mixer. A mixing ratio (mass ratio) of the resin to the glass filler powder is preferably from 95:5 to 25:75, more preferably from 90:10 to 40:60, even more preferably from 85:15 to 50:50, and particularly preferably from 80:20 to 60:40. When a content of the glass filler powder is too small, the mechanical strength of a formed object tends to be inferior. Meanwhile, when the content of the glass filler powder is too large, the viscosity of the resin composition may become too large, and the fluidity decreases, making forming of an object difficult. Note that examples of the mixer include a three-roll mill and a planetary centrifugal mixer.

Method for Manufacturing Formed Object

Next, an example of a method for manufacturing a formed object using the resin composition according to an embodiment of the present invention will be described. Specifically, a method for manufacturing a three-dimensional shaped object using a resin composition containing a photocurable resin (a manufacturing method using so-called "3D printing") will be described.

First, one layer of a liquid layer including a photocurable resin composition is prepared. For example, a stage for shaping an object is mounted within a tank filled with the liquid photocurable resin composition, and a position of the stage is adjusted such that an upper surface of the stage is located at a desired depth (for example, approximately 0.2 mm) from the liquid surface. In this way, a liquid layer can be prepared on the stage.

Next, the liquid layer is irradiated with an active energy ray such as an ultraviolet laser beam, thus the photocurable resin is cured and a cured layer having a predetermined pattern can be formed. Note that in addition to ultraviolet light, laser light such as visible light, infrared light, or the like can be used as the active energy ray.

Next, a new liquid layer including the photocurable resin composition is prepared on the formed cured layer. For example, the stage for shaping an object described above is lowered for the equivalent of the depth of one layer, thus the photocurable resin composition is introduced onto the cured layer and a new liquid layer is prepared.

Thereafter, the new liquid layer prepared on the cured layer is irradiated with the active energy ray, thus a new cured layer that is continuous with the cured layer is formed.

By repeating the above operation, the cured layers are continuously stacked, resulting in a desired formed object.

Note that, other than the method described above, a known method such as injection molding may also be employed to produce a formed object using the resin composition according to an embodiment of the present invention.

The resulting formed object preferably has a thickness of 0.5 mm and preferably has a light transmittance at a wavelength of 600 nm from 60% to 8789% 89%, more preferably from 70% to 86%, and particularly preferably from 80% to 85%. In this way, the desired aesthetics of the formed object can be easily achieved, making the formed object suitable for denture application.

EXAMPLES

Hereinafter, the present invention will be described based on examples, but the present invention is not limited to the examples.

Table 1 presents the Examples (No. 1 to 6) and Comparative Examples (No. 7 to 9).

TABLE 1

|  | Examples | | | | | | Comparative Examples | | |
|---|---|---|---|---|---|---|---|---|---|
|  | No. 1 | No. 2 | No. 3 | No. 4 | No. 5 | No. 6 | No. 7 | No. 8 | No. 9 |
| Grinding Time in Ball Mill (hour) | 7 | 7 | 4 | 6 | 14 | 21 | 0.5 | 33 | 33 |
| Specific Surface Area of Glass Powder Immediately After Grinding in Ball Mill (m²/g) | 1.3 | 1.3 | 1 | 1.2 | 1.6 | 2 | 0.3 | 2.9 | 3 |
| Specific Surface Area of Glass Filler Powder (m²/g) | 1 | 1.1 | 0.9 | 1.1 | 1 | 1.1 | 0.5 | 0.8 | 2.9 |
| Roundness of Glass Filler Powder (μm) | <1 | <1 | <1 | <1 | <1 | <1 | <1 | <1 | <1 |
| Average Particle Size $D_{50}$ of Glass Filler Powder (μm) | 6.3 | 6 | 6.1 | 6 | 5.9 | 6 | 6.1 | 5.9 | 5.5 |
| Volume Fraction of Bubbles in Glass Filler Powder (%) | 0.8 | 0.9 | 0.4 | 0.6 | 1.5 | 1.9 | 0.1 | 2.4 | 2.1 |
| Transmittance of Resin Composition (%) | 83 | 82 | 86 | 84 | 72 | 65 | 90 | 59 | 55 |

Production of Glass Filler

Raw material powders were uniformly mixed in a ratio of 52.4 mass % of $SiO_2$, 16 mass % of $Al_2O_3$, 16 mass % of $B_2O_3$, 3.6 mass % of $K_2O$, 1.5 mass % of CaO, 1.5 mass % of ZnO, 1.2 mass % of $TiO_2$, 3.7 mass % of $Nb_2O_5$, and 4.1 mass % of $WO_3$. The resulting raw material batch was melted at 1580 to 1600° C. until it became homogeneous, the molten raw material batch was poured between a pair of rollers and formed into the shape of a film, and a glass material was obtained. The resulting glass material was ground in a ball mill and then subjected to air classification, and a glass powder was obtained. However, air classification was not performed for No. 9. Note that the grinding times in ball mill were set to the times presented in Table 1. Also, the specific surface areas of the glass powders immediately after grinding in ball mill are presented in Table 1.

The resulting glass powders were fed into a furnace by a table feeder, heated and melted at 1400 to 2000° C. by an air burner, and the glass powders were spheroidized. The spheroidized glass powders were subjected to elutriation classification, and glass filler powders (refractive index nd=1.51) were obtained.

The specific surface area, roundness, average particle size, and volume fraction of bubbles were measured for the obtained glass filler powders. The results are presented in Table 1.

The specific surface area was measured by a BET method.

The roundness was determined by the equation described above using the maximum particle size $D_{max}$ and the minimum particle size $D_{min}$ measured from an SEM image of each of the glass filler powders.

The average particle size was determined by laser diffraction/scattering particle size distribution measurement.

The volume fraction of bubbles was determined using the following equation based on the value of the true density and apparent density of each of the glass filler powders. Note that in the equation below, the true density of each of the glass filler powders was measured by the Archimedes method using the glass material formed into the shape of a film. The apparent density of each of the glass filler powders was measured using each of the resulting glass filler powders by a constant-volume expansion method.

Volume Fraction of Bubbles (%)=(True Density−Apparent Density)/True Density)×100

Production of Resin Composition

A resin composition was prepared by adding 30 parts by mass of each of the glass filler powders to 70 parts by mass of a curable resin (DL360, available from Digital Wax, refractive index nd=1.514 after curing) and mixing them using a planetary centrifugal mixer (ARE-310 available from Thinky Corporation).

Transmittance Measurement

An appropriate amount of each of the resulting resin compositions was placed on a microscope slide, sandwiched between the microscope slide and another microscope slide with a glass plate having a thickness of 0.5 mm as a spacer, and cured by irradiating with ultraviolet rays having a wavelength of 365 nm. In this way, formed objects having the shape of a plate were obtained.

The total light transmittance was measured for each of the produced formed objects by a spectrophotometer (UV-3100 available from Shimadzu Corporation). The transmittance at a wavelength of 600 nm was read from the obtained spectra. The results are presented in Table 1.

As presented in Table 1, the glass filler powders of Examples 1 to 6 had a porosity from 0.4% to 1.9%, and the transmittances of the resin compositions of Examples 1 to 6 were from 65% to 86%, which were desired values. Meanwhile, the glass filler powder of Comparative Example 7 had a low porosity of 0.1%, and the resin composition of Comparative Example 7 had a high transmittance of 90%. Also, the glass filler powder of Comparative Example 8 had a high porosity of 2.4%, and the resin composition of Comparative Example 8 had a low transmittance of 59%. In addition, the glass filler powder of Comparative Example 9 had a high porosity of 2.1% and a large specific surface area of 2.9 m²/g, and the resin composition of Comparative Example 9 had a low transmittance of 55%.

The invention claimed is:

1. A glass filler powder comprising a bubble therein, a volume fraction of the bubble being from 0.2% to 2%, from 40 to 80 mass % of $SiO_2$, from 0 to 30 mass % of $Al_2O_3$, from 2 to 20 mass % of $B_2O_3$, from 0 to 25 mass % of CaO, from 0 to 10 mass % of ZnO, from 0 to 10 mass % of $Li_2O$, from 0 to 30 mass % of $Na_2O$, from 0 to 30 mass % of $K_2O$, from 0 to 20 mass % of $Nb_2O_5$, from 0 to 20 mass % of $WO_3$, from 0.1 to 30 mass % of $Nb_2O_5+WO_3$, from 0.1 to 15 mass % of $TiO_2$, and from 0 to 10 mass % of F.

2. The glass filler powder according to claim 1, wherein the glass filler powder is substantially spherical.

3. The glass filler powder according to claim 1, wherein the glass filler powder has a specific surface area of 2 m²/g 2 m²/g or less.

4. The glass filler powder according to claim 1, wherein the glass filler powder has an average particle size of 8 μm or less.

5. The glass filler powder according to claim 1, wherein the glass filler powder has a refractive index (nd) from 1.48 to 1.62.

6. The glass filler powder according to claim 1, wherein the glass filler powder is blended with a resin.

7. A resin composition comprising the glass filler powder according to claim 1 and a resin.

8. A formed object comprising the resin composition according to claim 7.

9. The formed object according to claim 8, wherein the formed object has a thickness of 0.5 mm and a light transmittance at a wavelength of 600 nm from 60% to 89%.

10. A method for manufacturing the glass filler powder according to claim 1, the method comprising: grinding and classifying a glass raw material to yield a glass powder; and heating and melting the glass powder to spheroidize the glass powder.

11. The method for manufacturing a filler powder according to claim 10, wherein the glass raw material is ground by a ball mill.

\* \* \* \* \*